March 22, 1949.  T. E. BOOTH  2,465,192
SCRAPING APPARATUS
Filed March 16, 1946  2 Sheets-Sheet 1
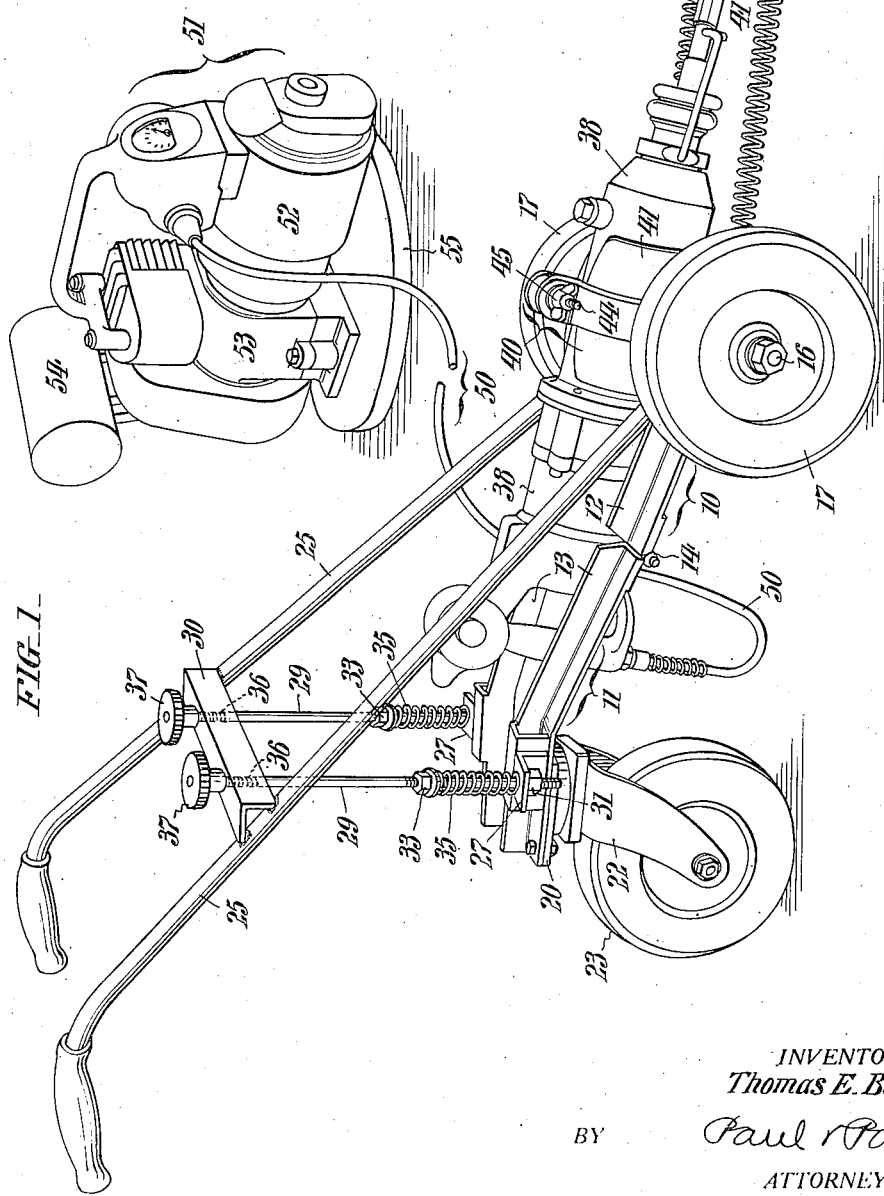
INVENTOR:
Thomas E. Booth,
BY Paul & Paul
ATTORNEYS.

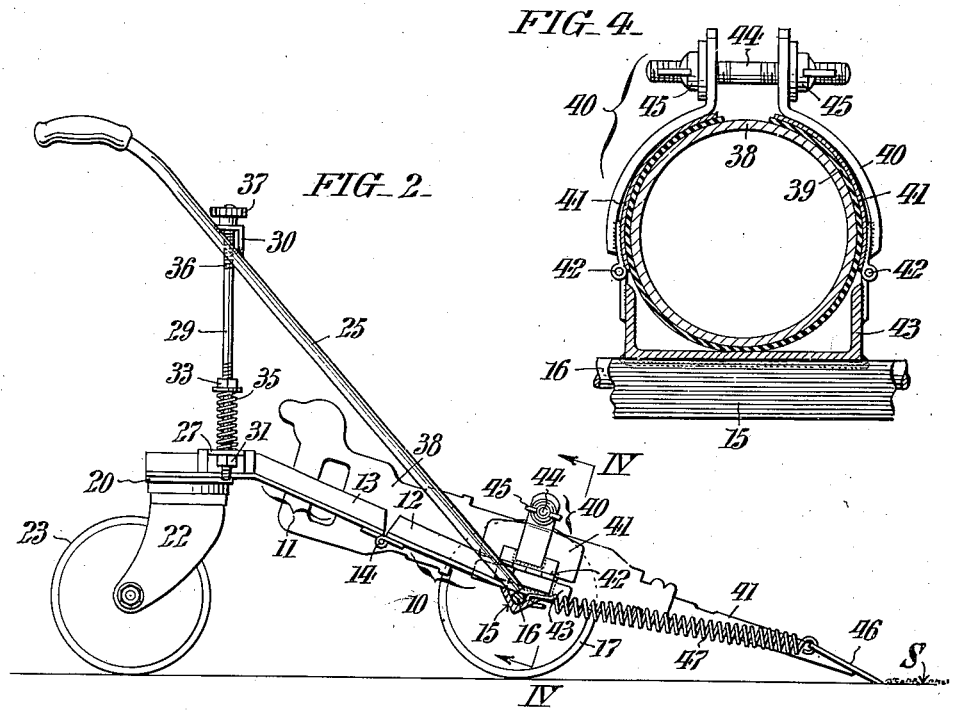
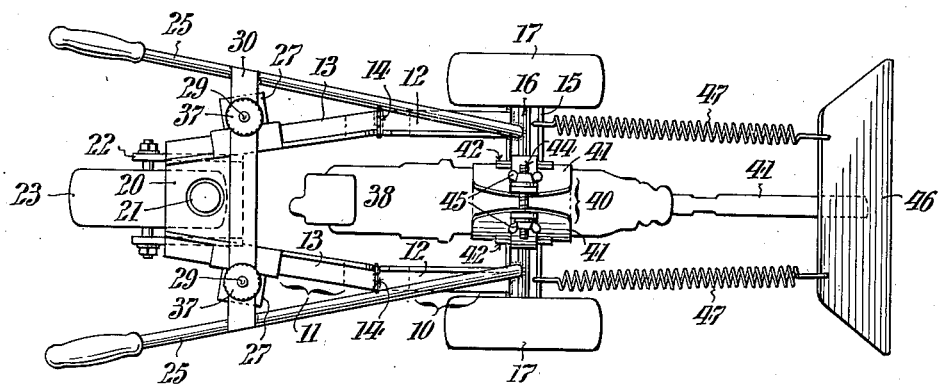

Patented Mar. 22, 1949

2,465,192

UNITED STATES PATENT OFFICE 2,465,192

SCRAPING APPARATUS

Thomas E. Booth, Beaumont, Tex.

Application March 16, 1946, Serial No. 654,838

6 Claims. (Cl. 262—13)

1

This invention relates to scraping apparatus. More particularly, it has to do with a powered scraping means useful for example in loosening gravel and old tar from roof structures in preparation for repairs or renewals, and of a type wherein a reciprocating scraper blade is relied upon to dislodge the gravel and tar.

My invention is directed toward the provision of a manually guidable implement of the kind referred to which is of simple and compact construction, easily manipulated, and efficient as well as reliable in its operation.

In connection with a scraping apparatus having the above attributes, I further aim to provide for ready regulation of the position of the scraper blade in respect to the surface to be acted upon, and to make possible lifting of the blade from contact with the surface from time to time as may be necessary or desired during the scraping without affecting the adjustment after it has once been made.

Other objects and attendant advantages will appear from the following detailed description of the attached drawings, wherein Fig. 1 is a perspective view of the complete scraping apparatus of my invention.

Fig. 2 is a longitudinal sectional view of a scraper carriage forming a part of the apparatus.

Fig. 3 shows the carriage in top plan; and

Fig. 4 is a detail cross sectional view drawn to an enlarged scale and taken as indicated by the angled arrows IV—IV in Fig. 2.

As herein illustrated my improved scraping apparatus includes a manually-shiftable carriage in the form of a hand truck having a forwardly-declining frame with longitudinally-arranged front and rear components 10 and 11 fashioned from structural steel and involving side bars 12 and 13 which, at their contiguous ends, are connected by transversely-aligned horizontal axis pivots or hinges 14. At their forward ends the side bars 12 of the front frame component 10 are rigidly connected, as by welding, to a crosswise angle piece 15 through the trough of which extends an axle 16 for supporting wheels 17 with pneumatic tires. The side bars 13 of the frame component 11 of the frame are convergent rearwardly toward a connecting plate 20 which affords a swivel post bearing 21 for the yoke 22 of a steering wheel 23 which is also shown as provided with a pneumatic tire. The carriage is further characterized by having rearwardly and upwardly inclined handle bars 25 which are rigidly connected to the crosswise angle piece 15 of the front frame component 10 adjacent the

2 opposite ends thereof, likewise preferably by welding, and which are divergent and extend over the rear frame component 11.

Projecting laterally from the bars 13 of the rear frame component 11 somewhat forwardly of the bearing 20 are lugs 27, these being pierced for passage of two vertical rods 29 which extend freely up through aligned apertures in a cross piece 30 extending between the handle bars 25. At their lower ends the rods 29 are provided with stop heads 31 which abut the bottoms of the lugs 27; and in compression between the tops of said lugs and nuts 33 affording shoulders on the mid portions of said rods are helical springs 35. The upper protruding ends of the rods 29 are threaded as at 36 for manually-operable adjusting nut wheels 37 that bear on the top of the cross bar 30. The parts just described constitute a regulating means the function of which will be more clearly pointed out presently.

Mounted on the forward frame component 10 is an electrically-powered actuating means in the form of a motor hammer 38 which may be of any approved commercial type, its cylindric body being secured, with interposition of a friction band 39 of rubber or the like by means of a flexible clamp strap means 40 whereof the opposing halves 41 are hinged at 42 to the side flanges of a cradle channel 43 forming part of said frame component, and drawn together by a screw bolt 44 with associated wing nuts 45. By virtue of being mounted in this way, the actuating means 38 and its forwardly-reaching endwise-reciprocating shaft 41 take the inclination of the supporting frame component 10 as best seen in Fig. 2. To the front end of the shaft 41 is rigidly secured a relatively wide scraper blade 46, which is subject to the rearward pull of a pair of helical tension springs 47. As shown the opposite ends of these springs 47 are hooked into apertures respectively adjacent the rear edges of the blade 46 and in aligned apertures in the transverse angle bar 15 of the frame component 10. The purpose of the springs 47 is to retract the blade shaft 41 after each forward blow imparted to said shaft by the actuating means 38.

In use, the carriage is moved forwardly over the surface S of the roof to be scraped and the blade 46 constantly reciprocated by the actuating device 38 in a manner which will be readily apparent. In preparation for use of the carriage the wheel nuts 37 are turned in one direction or the other as may be required with the result that the front frame component 10 by reason of the pivot connections between it and the rear component 11 is moved about the axis of the wheels 17 as a center with incidental change in the inclination of the actuating device and of the scraper blade 46 relative to the roof surface. Thus through this means the blade 46 can be very accurately regulated to engage beneath the gravel on the roof surface and effectively loosen the same. In this connection it will be noted that the springs 35 serve to normally maintain the carriage frame components 10 and 11 in the adjusted position, but, upon depression of the handle bars 25, will yield to permit relative movement of said components whereby the blade 46 may be lifted from time to time from contact with the roof surface when desired or required during the scraping.

Electric current is conducted from a suitable source of supply to the motor hammer through a cable 50. When electric current is not available on the premises a separate portable generating unit such as shown at 51 in Fig. 1 may be employed, this unit including a generator 52 which is directly connected to the shaft of an internal combustion motor 53 supplied with gasoline from an attached tank 54, all mounted on a common base 55.

Having thus described my invention, I claim:

1. Scraping apparatus including a carriage adapted for movement over a surface to be scraped, said carriage having a frame with two longitudinally-arranged components connected at their contiguous ends by a transverse axis pivot means and respectively having supporting wheels at their remote ends; a scraper blade; an actuating device mounted on one of the frame components and having a forwardly projecting endwise reciprocating shaft to the outer end of which the blade is secured; and regulating means constructed and arranged for moving the inter-pivoted frame components relative to each other to angularly adjust the blade in respect to the surface being scraped.

2. The invention according to claim 1, wherein the actuating device is power operated and imparts successive hammer blows to the blade; and wherein a spring means tensioned between the blade and the frame serves to effect the return movements of the shaft.

3. The invention according to claim 1, wherein one of the frame components has a rearwardly inclined handle bar means for guiding the carriage; wherein a spring means serves to maintain the frame components in adjusted relation; and wherein said frame components are movable relatively in opposition to said spring means by downward pressure upon the handle bars when it is desired to temporarily raise the blade from contact with the surface being scraped.

4. The invention according to claim 1, wherein one of the carriage components is provided with a transverse axle with a pair of supporting wheels; and wherein the other frame-component is provided with a single swivelling steering wheel.

5. The invention according to claim 1, wherein one of the carriage components is provided with a transverse axle with a pair of supporting wheels; wherein the other frame-component is provided with a single swivelling steering wheel; wherein the frame component supporting the blade-actuating device is provided with a rearwardly and upwardly inclined handle bar means which extends over the other frame component; and wherein the regulating means comprises a vertical rod which, at its bottom, is connected to said other frame component and which passes upward through the handle bar means, and a manually operable adjusting nut engaging threads on the protruding end of said rod and bearing on the handle bar means from above.

6. The invention according to claim 1, wherein one of the carriage components is provided with a transverse axle with a pair of supporting wheels; and wherein the other frame-component is provided with a single swivelling steering wheel; wherein the frame component supporting blade-actuating device is provided with a rearwardly and upwardly inclined handle bar means which extends over the other frame component; and wherein the regulating means comprises a vertical rod which passes freely through apertures respectively in said other frame component and the handle bar means and has a stop head at its lower end, a manually operable adjusting nut engaging threads at the upper end of the rod and bearing on the handle bar means from above, and a spring in compression between said other frame component and a shoulder on the mid portion of said rod.

THOMAS E. BOOTH.

REFERENCES CITED

The following references are of record in the file of this patent:

UNITED STATES PATENTS

| Number | Name | Date |
| --- | --- | --- |
| 1,202,484 | Christiansen | Oct. 24, 1916 |
| 1,535,411 | Hansen | Apr. 28, 1925 |
| 2,245,544 | Miller | June 10, 1941 |
| 2,326,514 | Bard | Aug. 10, 1943 |
| 2,348,796 | Ferwerda et al. | May 16, 1944 |